United States Patent
Keledy et al.

[11] 3,713,127
[45] Jan. 23, 1973

[54] ACOUSTIC EMISSION CRACK MONITOR

[75] Inventors: Francis C. Keledy, Butler; Kenneth R. Notvest, Ramsey, both of N.J.

[73] Assignee: Trodyne Corporation, Teterboro, N.J.

[22] Filed: Oct. 16, 1970

[21] Appl. No.: 81,448

[52] U.S. Cl. .....................340/261, 73/67, 73/67.3
[51] Int. Cl. ................................................G08b 21/00
[58] Field of Search ...340/261; 73/67, 67.3, 69, 67.4

[56] References Cited

UNITED STATES PATENTS

| | | | |
|---|---|---|---|
| 3,543,261 | 11/1970 | Burney | 340/261 |
| 3,364,477 | 1/1968 | McDonough | 340/261 |
| 2,788,659 | 4/1957 | Radnar et al. | 73/67.4 |
| 3,585,581 | 6/1971 | Aune et al. | 340/261 |

OTHER PUBLICATIONS

Dunegin & Harris, Ultrasonics, 7/69, pp. 160–161.

Primary Examiner—Donald J. Yusko
Assistant Examiner—Michael Slobasky
Attorney—Sandoe, Hopgood & Calimafde

[57] ABSTRACT

A system for monitoring crack growth in a structure in which acoustic energy released as a result of a crack event is sensed and integrated to provide a binary signal representative of the number and intensity of individual crack events. The binary crack energy data signals are accumulated and a warning device is activated when the stored crack data exceeds a predetermined level. Means may be provided to discriminate crack event signals from similar acoustic signals resulting from noise and impact or vibration.

18 Claims, 3 Drawing Figures

PATENTED JAN 23 1973

INVENTORS
KENNETH R. NOTVEST
FRANCIS C. KELEDY
BY
Sandoe, Hopgood & Calimafde
ATTORNEYS

INVENTORS
KENNETH R. NOTVEST
FRANCIS C. KELEDY

ACOUSTIC EMISSION CRACK MONITOR

The present invention relates to crack detecting apparatus, and more particularly to a crack detecting and monitoring system which provides a real-time indication of crack growth in a material.

Cracks are formed in a material as a result of factors including fatigue or corrosion in the material. If the developing cracks remain undetected and are allowed to increase in area, the crack may reach sufficient size to cause the material to fail at stresses below the normal yield strength of the material. This is believed to result from the resulting concentration of localized stresses above the yield strength at the location of the crack in the material. The larger the crack, the greater is the likelihood of brittle failure in the material.

The need thus exists for apparatus capable of detecting the presence and the growth of such cracks in a material, and providing an indication of possible material failure long before the occurrence of a failure, which may have catastrophic results. An additional benefit derived from the monitoring of the crack history of a structure is that it permits an accurate analysis of the metallurgical history of the crack-plagued structure, thereby enabling the metallurgist to often eliminate the causes of the cracking. Cracking due to interstitial embrittlement, stress-rupture, transformation cracking, stress corrosion, and delayed cracking may be thus identified and prevented.

It has been observed that materials when undergoing fracture produce a wave-like propagation of released strain energy (stress wave emission) also known as acoustic waves. In the formation of cracks in the material, particularly those resulting from fatigue, it has been observed that the crack growth is incremental, that is, the crack grows in discrete steps rather than in a continuous manner. Upon each incremental crack event, a burst or pocket of acoustic energy is released and propagated in the material. The energy released is of varying amplitude corresponding to the magnitude of the crack event, and is at random frequencies extending over a broad band spectrum.

It has been proposed to detect these crack generated acoustic waves (hereinafter also referred to as crack energy or crack event signals) as a means for sensing and monitoring the formation and growth of cracks. These proposed systems have, however, been hampered by their failure to distinguish the crack energy and external interference and noise, as well as by their inability to relate the acoustic crack signals to a real-time indication of the progress and extent of the crack.

It is an object of the invention to provide an instrument which reliably and accurately indicates the extent of crack growth in a structure.

It is a further object of the invention to provide a crack detection instrument of the type described which is able to discriminate between crack energy and mechanical noise energy.

It is another object of the invention to provide a crack detection and monitoring instrument having the capability of automatically providing an alarm when the monitored crack growth has exceeded a predetermined safe level. It is yet a further object of the present invention to provide a crack detection and measuring instrument capable of providing a real-time indication of the crack growth history of the structure being monitored.

To these ends, the crack detection instrument of the invention comprises means for detecting the release of crack energy and for thereafter integrating the detected crack energy signals, and converting the integrated signals into a binary count signal which is representative of the number and intensity of the individual detected crack events. The crack data count signals are accumulated to provide a real-time indication of the extent of crack growth in the material. Whenever the accumulated crack data exceeds a predetermined safe level an indicator is actuated to thereby automatically provide a warning signal.

The crack energy sensor is herein shown as a piezoelectric transducer element mechanically attached to the structure being monitored. The signal produced by that element upon the propagation of crack or other acoustic energy is passed through an active filter which filters out normal vibration and acoustic noise. The amplified signal is then applied to a level detector where it is compared against a preset level above the noise level at that stage. As a result only significant level acoustic signals are processed to derive the binary crack event signals which are thereafter stored.

In another aspect of the invention, means are provided to distinguish between crack energy acoustic signals and acoustic signals resulting from mechanical impact on the structure being monitored. To this end, the instrument of the invention may be provided with an impact discriminator which operates by analyzing the waveform of the detected acoustic signal and then comparing that signal against a "synthetic" waveform. In the event that a spurious impact signal is sensed, the operation of the count signal generating circuit is disabled for the duration of the impact signal.

To the accomplishment of the above and to such further objects as may hereinafter appear, the present invention relates to an acoustic emission crack monitor substantially as defined in the appended claims, and as described in the following specification taken together with the accompanying drawings in which:

Figure 3:
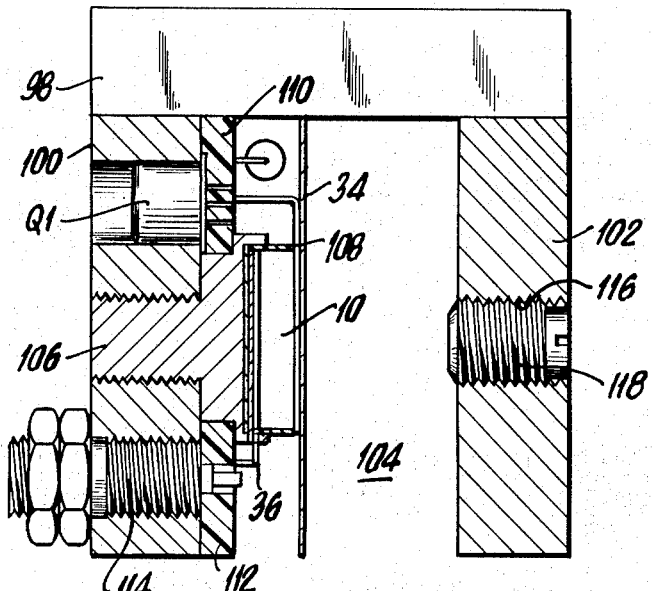
FIG. 3 is a cross-sectional view of a typical holder for mounting the acoustic energy detector employed in the instrument of the invention on the structure to be monitored for crack growth.

The crack detection instrument illustrated in the drawings has the capability of detecting and distinguishing the occurrence of a crack event in a structure, by sensing the release of acoustic energy from the structure. The crack event data is integrated and then converted to binary form representative of the number and the intensity of the individual crack events. The stored crack event data can be employed to provide a warning signal whenever the stored crack data exceeds a predetermined safe level.

Figure 1:
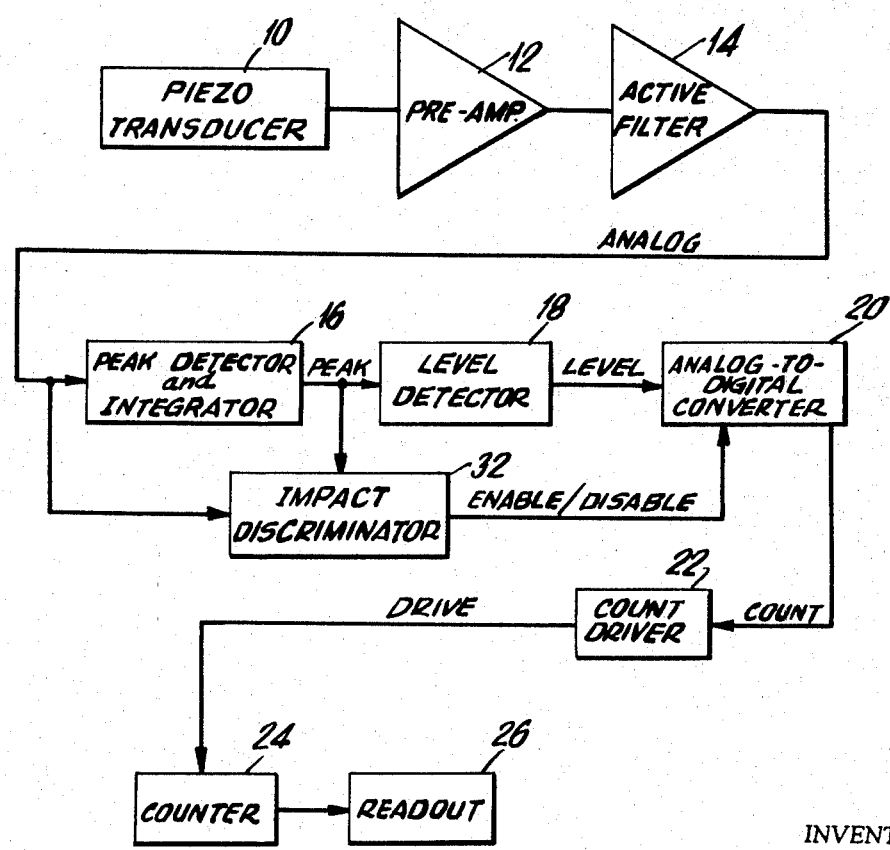
FIG. 1 is a schematic block diagram of the crack detection instrument of the invention.

Referring to FIG. 1, the instrument of the invention illustrated therein comprises an acoustic energy sensor in the form of a piezoelectric transducer 10, such as a 1.7 mHz frequency ceramic piezo. As described more completely with reference to FIG. 3, transducer 10 is mounted in a relatively massive holder that is adapted to be clamped to the structure being monitored in a manner such that the transducer is sensitive to shear waves that may occur in the structure such as a result of a growth of a crack (crack event). The natural frequency of the transducer holder is independent of that of the transducer piezo element and is sufficiently low such that any extraneous signals resulting from holder vibration are electronically filtered by the transducer.

The electrical signals produced by transducer 10, as a result of the release of acoustic energy in the surface, are coupled to a pre-amplifier 12, which is preferably, and as shown in FIG. 3, fixedly mounted on the transducer holder. The mounting of pre-amplifier 12 in this manner serves to reject common mode spurious signals and to provide a low impedance source to the following stages of the instrument.

The amplified signals from pre-amplifier 12 are coupled to a filter-amplifier 14 which includes a pass-band filter for passing signals at frequencies centered about 200 kHz, to thereby eliminate extraneous noise signals from the detected acoustic signal. The amplified signal at the single ended output of amplifier 14 is an analog signal that is coupled to a peak detector and integrator 16. Detector 16 detects the envelope of the amplified transducer signal and converts that signal into a peak signal proportional to the amplitude of the analog crack event signal.

The peak signal output of peak detector 16 is applied to a level detector 18 at which the peak signal is compared to a preset reference signal. The level of the reference signal is determined by the level of the noise voltage at the level comparator in detector 18 such that level detector 18 produces no output level signal as a result of only a noise voltage signal.

When the peak signal exceeds the reference signal, detector 18 produces a level signal which has a period proportional to the amplitude of the peak signal for reasons to be described below with reference to the schematic diagram of FIG. 2. Thus, as desired, detector 18 produces an output level signal only upon the detection of a significant acoustic energy release from the structure being monitored.

The level signal is applied to a normally disabled analog-to-digital converter 20, which produces one or more crack event pulses upon the presence of a level signal at the output of level detector 18 and the absence of a disabling pulse, as will be described below. The number of count pulses produced by converter 20 is proportional to the duration of the level signal, and is thus proportional to the intensity of the detected crack event signal. The count signals are applied to a pulse drive circuit 22 which converts the count pulses into drive pulses which are in turn accumulated or stored in a counter 24 here shown in the form of an electro-mechanical counter which is preset to a count corresponding to a maximum safe crack level or area in the structure. When the cumulative count in counter 24 exceeds the preset count a warning indicator 26 is actuated to indicate an unsafe crack condition in the structure. Counter 24 may also be periodically interrogated to determine from its stored count, the extent of crack growth in the structure so that a prediction of the remaining useful life of the structure can be made, and appropriate maintenance procedures can be developed and initiated.

In another aspect of the invention, the crack detection instrument is further provided with an impact discriminator 32 which compares, in a manner more completely set forth in a later part of the application, the peak signal and a reference "synthetic" signal derived from the peak signal. In the event that discriminator 32 determines that the level signal is a result of an impact energy signal rather than a crack energy signal, it produces an inhibit signal which disables analog-to-digital converter 20 for the complete duration of the level signal, and the cumulative count in counter 24 remains unchanged during this period.

Figure 2:
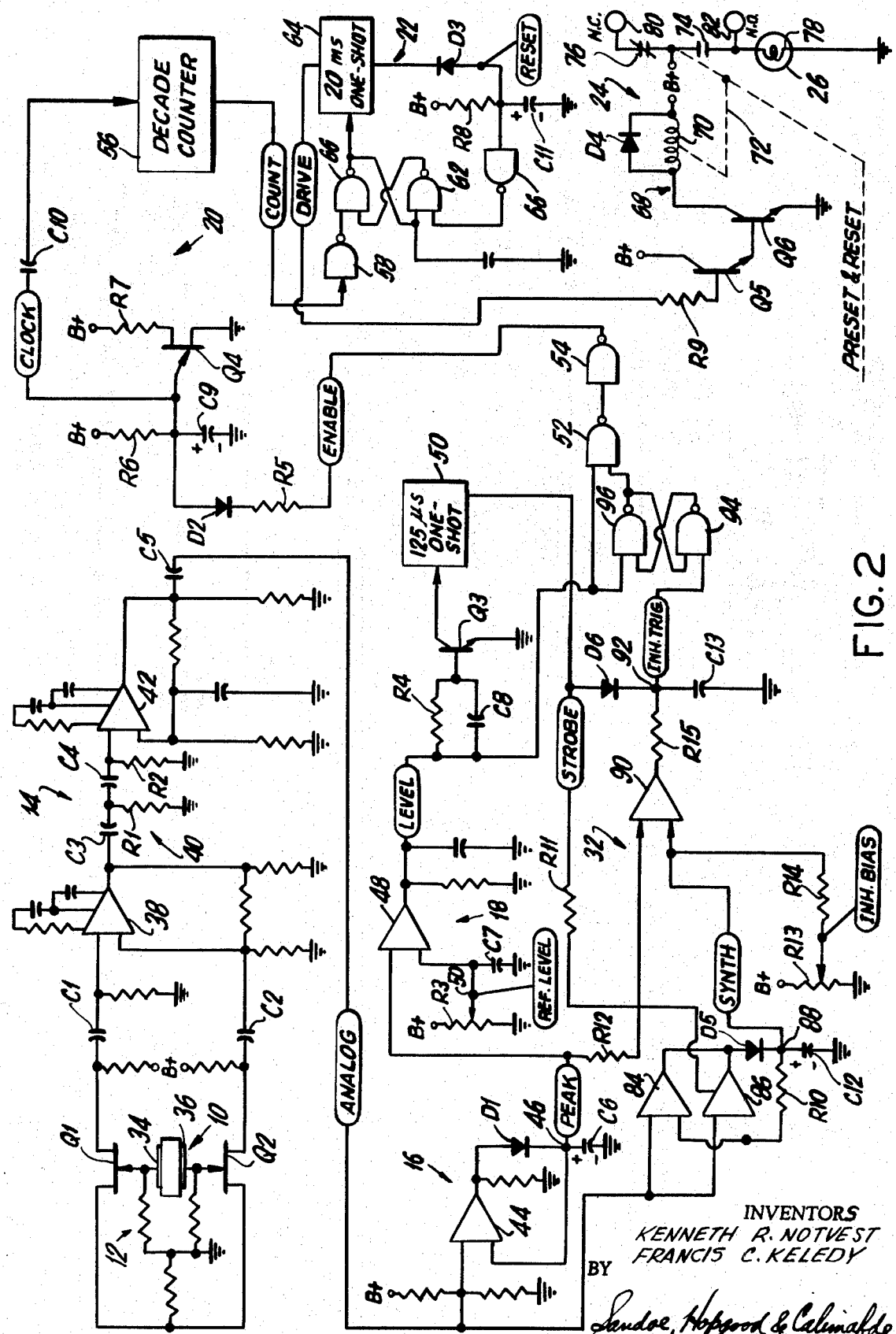
FIG. 2 is a more detailed schematic diagram of the instrument of FIG. 1.

The system illustrated in block form is illustrated in greater detail in FIG. 2 in which corresponding sections are designated by the reference numerals employed in FIG. 1. As shown in FIG. 2 the upper and lower terminals 34 and 36 of the piezoelectric transducer 10 are respectively applied to the gate terminals of FET Q1 and FET Q2 which define the differential pre-amplifier 12. The output terminals of FET's Q1 and Q2 are coupled through capacitors C1 and C2 to the input terminals of an operational amplifier 38, the output of which is in turn coupled through a network 40 comprising series-connected capacitors C3 and C4 and resistors R1 and R2 connected to these capacitors and ground, to the input terminal of a second operational amplifier 42. Amplifiers 38 and 42 and network 40 define active amplifier 14 which amplifies and filters the acoustic energy signal about a pass band of 200 kHz to remove normal vibration and acoustic noise.

The single-ended output of amplifier 42, which is in the form of an analog signal having an amplitude proportional to the magnitude of the detected acoustic energy, is applied through a capacitor C5 to the input of an amplifier 44. A diode D1 is connected to the output of amplifier 44 and to a point 46 to which one terminal of a capacitor C6 is connected. The other terminal of capacitor C6 is connected to ground. Point 46 is also connected to the other input of amplifier 44.

Amplifier 44, diode D1, and capacitor C6 define the peak detector and integrator 16 and serve to detect the envelope of the analog signal and to charge capacitor C6 to a peak signal proportional to the envelope amplitude. The peak signal is applied to one input of a comparator-amplifier 48, the other input of which is a preset reference signal obtained at the wiper arm 50 of a variable resistor R3. A capacitor C7 is connected between wiper arm 50 and ground.

Amplifier-comparator 48 defines level comparator 18 and produces a level signal in the form of a pulse whenever the peak signal exceeds the preset reference signal. The level of the latter is preset by a suitable adjustment of resistor R3 in accordance with the ambient mechanical noise signal at the other comparator input, with the desired result that no level detection is made at comparator 48 under noise signals only.

During the operation of comparator 48, the peak signal stored on capacitor C6 discharges through comparator 48 and capacitor C7. The comparator will continue to produce the level signal until the peak signal has discharged to the level of the reference signal. As a result the duration of the level signal pulse is proportional to the amplitude of the peak signal, and thus to the magnitude of the sensed acoustic energy signal.

The level signal produced by level detector 16 at the output of comparator 48 is applied through a coupling network consisting of a capacitor C8 connected in parallel with a resistor R4 to the base of a transistor Q3 connected in a grounded emitter configuration. The level signal is inverted by transistor Q3 and the thus inverted signal is coupled to a one-shot 50 which, when triggered by the inverted level pulse, generates a 125µs strobe gate. The gate is employed in a manner which is described in a later part of the specification in conjunction with the operation of impact discriminator 32.

The level signal is also applied to one input of a NOR gate 52 the output of which is in turn connected to the input of a NOR gate 54. In the absence of an inhibit signal at the other input of gate 52 (which is produced in response to impact acoustic energy signals, as will be described below) an enabling signal is produced at the output of gate 54. The enabling signal is applied through a resistor R5 and a diode D2 to the emitter of a unijunction transistor Q4. A capacitor C9 is connected between the emitter of transistor Q4 and operating voltage is applied to that emitter through a resistor R6. The bases of transistor Q4 are respectively coupled to the voltage supply through a resistor R7 and to ground.

Transistor Q4 defines a free-running sawtooth oscillator that is operable only in the presence of the enabling signal at its emitter; in the absence of that signal the oscillator is inoperative. When the enabling signal is present, the oscillator produces a clock signal at a 1 kHz rate. The clock signals are coupled through a capacitor C10 to a decade counter 56 which produces a count signal at its output for each series of ten input clock pulses. Since the oscillator is only enabled for the period of the enabling signal, the number of count pulses received at counter 56 is thus representative of the duration of the level signal and thus of the amplitude of the detected acoustic energy signal. The oscillator, comprising transistor Q4, and counter 56 thus defines the analog-to-digital converter 20.

The binary count signal or signals produced by counter 56 are applied to an inverting NOR gate 58, the output of which is in turn coupled to an OR gate 60. The output of the latter gate is in turn coupled to one input of a NOR gate 62 whose output is in turn coupled to the other input of gate 60.

Gates 60 and 62 thus define a count signal latching circuit. The pulse output of that latching circuit is coupled to the trigger input of a one-shot 64 which, upon the receipt of a trigger pulse, generates a 20ms drive signal. The low output of one-shot 64 is coupled through a diode D3 to a timing circuit consisting of a resistor R8 and a capacitor C11 to an inverting NOR gate 66 which has an output connected to the input of the latch circuit NOR gate 62. The timing circuit is charged during the 20ms "on" period of one-shot 64, and at the end of that period discharges to produce a 30ms disabling signal to the latch circuit. Should there be an additional count signal received from counter 56 during the combined on-off 50ms period of one-shot 64, that signal will be held in the latch circuit and applied to the one-shot at the completion of the 30ms off period to produce a new drive 20ms signal at the high output at one-shot 64.

The drive signal output of one-shot 64 is coupled through a resistor R9 to the base of a transistor Q5. The emitter of transistor Q5 is connected to the base of a transistor Q6 connected in a Darlington pair configuration with transistor Q5. The collector of transistor Q6 is connected to a device for accumulating or storing the individual crack event drive signals, here shown as a mechanical counter 68 represented by a coil 70 across which is connected a diode D4.

Counter 68 is provided with a preset count representing the maximum number of crack events that can be tolerated in the structure being monitored within the limits of safety. Each drive signal applied to the counter causes its count to be updated by one so that the cumulative count of counter 68 is directly representative of the number and relative intensities of the individual detected crack even-acoustic signals, since, as will be understood from the above, a single crack event of a relatively high intensity can produce two or more drive signals to the crack event signal storage counter.

When the cumulative crack event count equals the preset threshold count, a mechanical switch 72 is actuated causing the normally open contacts 74 to close, and the normally closed contacts 76 to open. The former operation causes an indicator, here shown as a lamp 78, to be energized to thereby provide an alarm that the structure under crack surveillance has been weakened to a critical extent as a result of continuing crack activity. The relay contacts may also control external indicators (not shown) that can be connected at terminals 80 and 82.

In order for the warning of indicator 78 to be independent of detected acoustic signals such as those that are caused by mechanical impacts on the structure, the instrument of the invention also includes, as noted above, impact discriminator 32. Discriminator 32 operates by a "signature analysis" on the detected analog waveform, based on the observation that most crack induced acoustic energy signals have a relatively rapid or sharp rise time, while impact induced signals have a relatively slow rise time in excess of 125 µs.

Discriminator 32 comprises amplifiers 84 and 86, each of which receives the analog inputs from amplifier 42 at one of its inputs. The other inputs of amplifiers 84 and 86 are coupled through a resistor R10 to a point 88, and the outputs of these amplifiers are connected in common through a diode D5 to point 88. A capacitor C12 is connected between point 88 and ground.

The 125 µs strobe signal produced by one-shot 50 as described above is applied through a resistor R11 to a control terminal of amplifier 86 and causes that amplifier to be operative only during the strobe period. Amplifiers 84 and 86 thus integrate and produce a peak signal comparable to that produced at point 46 of peak detector 16, but only during the strobe period. The peak signal at point 46 is referred to as the real peak, while the peak signal at point 88 is referred to as the synthetic peak.

The real and synthetic peaks are applied respectively to the two inputs of a comparator 90, the former through a resistor R12. A preset inhibit bias signal derived from a variable resistor R13 is coupled through a resistor R14 to the input of comparator 90 which also receives the synthetic peak. The output of comparator 90 is connected through a resistor R15 to a point 92. The strobe signal is also applied to point 92 through a diode D6 to unconditionally maintain point 92 high during the strobe period. A capacitor C13 is connected between point 92 and ground.

Point 92 is also connected to an input of a NOR gate 94 which has an output connected to one input of a NOR gate 96, the output of which is coupled back to the other input of gate 94. The other input to gate 96 is the level signal output of comparator 48 and its output is coupled to the input of gate 52, it being recalled that the other input of gate 52 also receives the level signal.

In operation, comparator 90 compares the real and biased synthetic peaks at a time approximately $125\mu$ s after the production of the level signal at comparator 48, that is, the detection of a significant acoustic energy signal. During the initial $125\mu$ s period, the output of comparator 90 is high and the enabling signal is produced at the output of gate 54. However, the sawtooth oscillator which operates at a 1 kHz rate is not actuated by the level signal during this initial strobe period. At the end of the strobe period, point 92 is no longer unconditionally charged high, amplifier 86 is disabled, and the synthetic peak signal having reached a maximum level at the end of the strobe period now begins to decrease.

For a crack event signal, as opposed to an impact signal, the real peak signal at the end of the $125\mu$ s strobe period has decreased from its initial high level, so that the level of the synthetic peak at that time exceeds that of the real peak and the output of comparator 90 is therefore low. On the other hand, an impact signal produces a real peak signal which is still increasing in level after the end of the strobe period, and would thus exceed the level of the synthetic peak signal at that time. For this latter impact condition of the real and synthetic peak signals, comparator 90 produces a high or inhibit signal at point 92 which is applied to one input of gate 94. That signal, when produced in the manner just described, is coupled in the logic and latching gates 52, 54, 94 and 96 to cancel the enabling signal and thus disable the clock pulse oscillator. As a result of the operation of the latch circuit consisting of gates 94 and 96, the impact signal once detected in discriminator 32 will disable the clock oscillator for the duration of the event, that is, the duration of the level signal. As a result the clock oscillator produces crack event count pulses only upon the detecting and distinguishing of a crack event acoustic signal, as is desired, and the instrument of the invention thus has the ability to distinguish between crack acoustic energy and acoustic energy resulting from mechanical impact.

FIG. 3 illustrates a holder assembly that is highly suited for mounting the acoustic transducer element to the structure being monitored. The holder, which preferably has a mass significantly larger than that of the transducer element 10, is yoke-shaped and includes a base 98 from which two arms 100 and 102 extend, a recess 104 being defined between arms 100 and 102. Arm 100 has a threaded bore formed therein in which an anvil 106 is securely received. Piezo transducer 10 is mounted on anvil 106 and insulated therefrom by an insulating bushing 108. Printed circuit boards 110 and 112 containing FET's Q1 and Q2 and the associated resistances in the two sections of the differential pre-amplifier 12 are securely mounted on arm 100. As noted above, FET's Q1 and Q2 are connected to transducer 10 by the electrodes 34 and 36 extending from and connected to the opposing surfaces of the piezo element, as shown in FIG. 3.

Threaded receptacles 114 (only one of which is seen in FIG. 3) provide electrical connection between printed circuit boards 110 and 112 and the external active filter 14, and the remaining sections of the crack detection instrument. A threaded slot 116 is formed in arm 102 and receives a set screw 118.

In use, the structure under crack surveillance is placed within recess 104 and the set screw 118 is turned until the transducer holder is firmly clamped against the structure, in a manner enabling the detection by transducer 10 of acoustic energy released and propagated through the structure.

The crack detection and monitoring of the invention thus provides an accurate and reliable means for detecting the occurrence and cumulative effect of crack events occurring in a structure under crack surveillance, and moreover, automatically provides a warning signal when the cumulative crack data indicates an amount of crack activity exceeding a predetermined safe level.

Tests performed on one practical embodiment of the instrument of the invention have indicated a substantially linear relation between the extent of crack growth and the readout of the crack event counter 24 over a wide range of stress intensity and fracture toughness of the material of the structure being monitored. Moreover, the system of the invention is relatively insensitive to noise by virtue of low frequency attenuation and impact discrimination. In one practical embodiment of the invention crack areas as low as 0.0001 in.$^2$ and crack increments as low as 0.0004 in.$^2$ were detected, and crack data of 0.01 in.$^2$ were accumulated.

The crack detection and monitoring instrument of the invention can thus be used to great advantage in preventive maintenance operations as well as in metallurgical analysis on the crack susceptibility of structures under predetermined conditions such as stress and fatigue. The instrument of the invention may also be advantageously employed with respect to thermally hot structures, such as weldments and structures being heat-treated. In this manner cracking such as temper embrittlement and stress rupture can be monitored relative to the time-temperature parameters causing the cracking.

While the crack event counter is herein shown as a mechanical counter, binary system such as a storage shift register or a binary accumulator could be employed to equal advantage whenever higher operating speeds are desired. Moreover, instead of providing an instantaneous, real-time indication whenever the stored crack data exceeds a predetermined level as herein specifically disclosed, the binary count data could also be stored in a suitable binary storage device which can be periodically interrogated for an indication of the level of crack growth.

Moreover, the instrument of the invention need not be limited to exclusively provide real-time indication or a stored crack data, but may be adapted to include both data storage arrangements in a single crack detection instrument and system.

Thus, while only a single embodiment of the present invention has been herein specifically described, it will be apparent that modifications may be therein without departing from the spirit and the scope of the invention.

We claim:

1. Apparatus for detecting and monitoring the incremental growth of a crack in a structure, comprising means for detecting the release of acoustic energy from the structure such as that produced as a result of a crack event in the structure, said detecting means including means for producing an analog signal having a predetermined relation to the magnitude of the energy released upon each release of such energy, and means coupled to said analog signal producing means for deriving a binary signal representative of the number and amplitude of said analog signals, said binary signal deriving means including means for producing one or more count signals the number of which bears a predetermined relationship to the amplitude of said analog signal, means coupled to said count signal producing means for accumulating said count signals, and means coupled to said detecting means for sensing the nature of the detected analog signal between a crack event signal and an impact signal, and means coupled to said sensing means for disabling said binary signal deriving means upon the determination that said detected analog signal is a result of an impact on the structure.

2. The apparatus of claim 1, further comprising means for comparing the number of accumulated count signals against a preset reference level, alarm means, and means coupled to said comparing means for actuating said alarm means when the number of accumulated counted signals equals or exceeds said reference level.

3. The apparatus of claim 1, further comprising means for operatively comparing said analog signal and a preset reference level and for producing an enabling signal when the former bears a predetermined relation to the latter.

4. The apparatus of claim 3, further comprising means operatively interposed between said detecting means and said comparing means for operatively integrating said detected analog signal to thereby produce a peak signal, said peak signal being applied to one input of said comparing means.

5. The apparatus of claim 3, in which said count signal producing means comprises pulse producing means coupled to said comparing means and actuated in response to said comparing means when said analog signal bears said predetermined relation to said reference signal.

6. The apparatus of claim 5, further comprising means coupled to said pulse producing means for summing the pulses produced by the latter, second means for comparing the summed number of said count signals against a preset count, and means for producing a warning signal when the former equals or exceeds the latter.

7. The apparatus of claim 1, further comprising means for deriving a synthetic signal from said detected analog signal, said sensing means comprising means for comparing the detected analog signal and said synthetic signal at a predetermined time after the detection of said analog signal and for producing a count disabling signal when the former bears a predetermined relationship to the latter.

8. The apparatus of claim 7, in which said synthetic signal deriving means comprises second detecting means receiving said analog signal and means for enabling said second detecting means after said analog signal detection and for thereafter disabling said second detecting means at said predetermined time thereafter.

9. The apparatus of claim 8, in which said enabling and disabling means comprising means coupled to said first detecting means for generating a gate having a duration of said predetermined time in response to the presence of said enabling signal.

10. The apparatus of claim 8, in which said disabling signal producing means comprises gating means having a first input coupled to said first detecting means and a second input coupled to said third comparing means.

11. The apparatus of claim 1, further comprising frequency selecting means operatively interposed between said detecting means and said analog signal producing means.

12. The apparatus of claim 11, in which said analog level signal producing means comprises means for comparing the detected analog signal against a preset reference level and to produce an enabling level signal when the former bears a predetermined relation to the former.

13. The apparatus of claim 1, further comprising means for deriving a synthetic signal from said detected analog signal, said sensing means comprising means for comparing the detected analog signal and said synthetic signal a predetermined time after the production of said analog signal, and for producing said disabling signal when the former bears a predetermined relationship to the latter.

14. The apparatus of claim 13, in which said synthetic signal deriving means comprises second detecting means receiving said analog signal, and means for enabling said second detecting means after said analog signal detection and for thereafter disabling said second detecting means at said predetermined time thereafter.

15. The apparatus of claim 14, in which said enabling and disabling means comprises means coupled to said first detecting means for generating a gate having a duration of said predetermined time in response to the presence of said level signal.

16. The apparatus of claim 15, in which said disabling signal producing means comprises gating means having a first input coupled to said first detecting means and a second input coupled to said comparing means.

17. The apparatus of claim 11, further comprising amplifying means operatively interposed between said detecting means and said frequency selecting means.

18. The apparatus of claim 17, in which said detecting means comprises a piezo element, and further comprising a holder having a mass significantly greater than that of said piezo element for carrying said piezo element and adapted to be securely clamped to the structure being monitored, said amplifying means comprising circuit elements securely mounted on said holder.

* * * * *